March 26, 1963 C. DODINAT 3,082,595
METHOD OF MAKING LAZY TONGS LINKAGE, EACH
LINK BEING MADE FROM ONE PIECE OF STOCK
Filed March 21, 1960
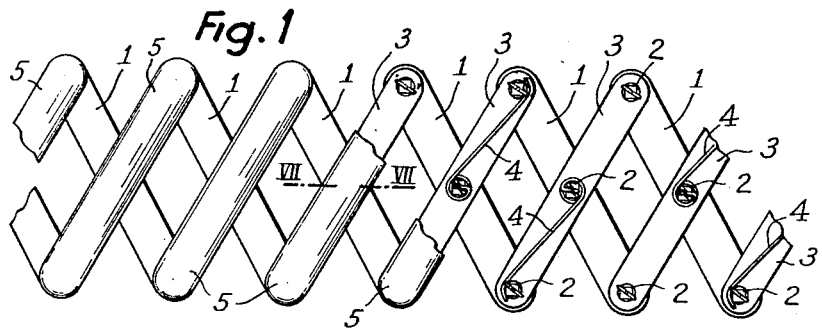
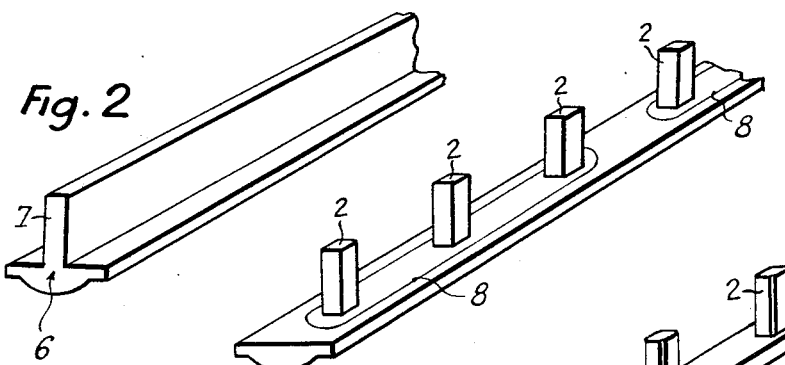
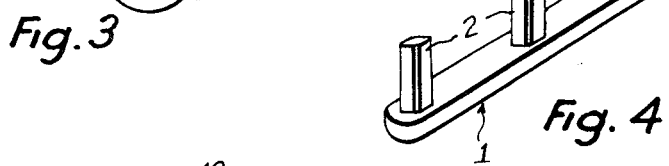
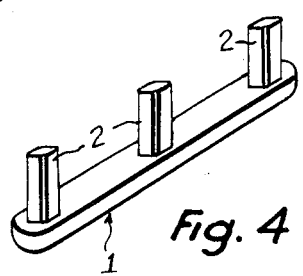
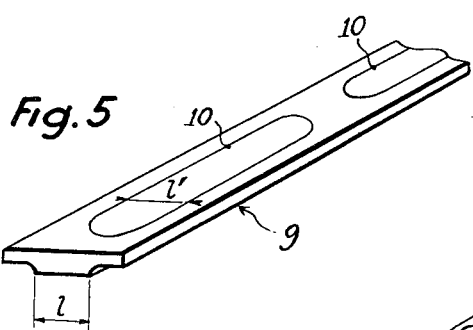
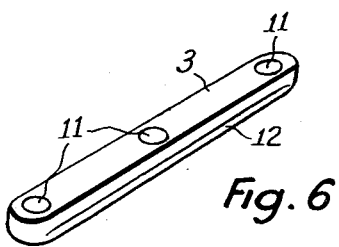
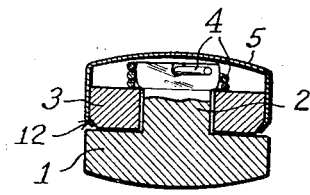

United States Patent Office 3,082,595
Patented Mar. 26, 1963

3,082,595
METHOD OF MAKING LAZY TONGS LINKAGE, EACH LINK BEING MADE FROM ONE PIECE OF STOCK
Camille Dodinat, 14 Rue Halevy, Paris, France
Filed Mar. 21, 1960, Ser. No. 16,491
Claims priority, application France Mar. 21, 1959
4 Claims. (Cl. 59—35)

This invention relates to methods of manufacturing expansible wrist-bands especially for use with wrist-watches, and specifically to a type of expansible wrist-band sometimes known as a "Nurenberg scissors" linkage, or simply an "expansible linkage."

In this type of expansible linkage there is provided a plurality of interpivoted links of equal length arranged in two sets all the links in each set being parallel to one another and each link in each set being pivoted at three points, namely each end and the centre thereof, to corresponding points of three respective links of the other parallel set, whereby the entire linkage is expansible and contractible along a line interconnecting the midpoints of all the links. As applied to bands for wrist-watches and the like, such an expansible linkage is usually provided with spring means acting on the respective links to urge the linkage into a contracted condition.

The invention is more especially concerned with the manufacture of the individual links of such an expansible linkage, and with the provision of the requisite pivotal means thereon.

In conventional expansible-linkage wrist-bands the pivots on the links are usually provided by punching projections out of the strip material constituting the links, or by bending lugs formed thereon out of the plane of the link, the resulting projections being inserted into recesses formed in the cooperating links of the opposite set. The resulting assembly lacks strength and is subject to failure after a short period of use through breakage of the pivot lugs or disengagement thereof from the cooperating recesses. Other conventional methods of providing the pivots have involved stamped pivots, and separately formed and inserted pivot rods. The resulting assemblies are stronger but are relatively expensive to produce.

It is an object of this invention to provide an improved expansible linkage for the specified purpose, which will be both sturdy and inexpensive to manufacture. An object is to provide improved expansible wrist-bands especially for wrist-watches, which will possess the advantageous features just mentioned.

An exemplary embodiment of the invention will now be described for purpose of illustration but not of limitation with reference to the accompanying drawings, wherein:

FIG. 1 is a plan view of part of an expansible-linkage wrist-band in expanded condition, parts of the decorative link-casing means being removed.

FIGS. 2, 3 and 4 are perspective views showing different stages in the manufacture of a male link for an expansible linkage by the method of the invention;

FIGS. 5 and 6 are similar views showing two stages in the making of a female link by the method of the invention; and FIG. 7 is a section on line VII—VII of FIG. 1.

As shown in FIG. 1, an expansible-linkage wrist-band e.g. for a wrist-watch comprises a first set of parallel so-called male links 1, the under side of which is adapted to engage the wearer's wrist, and a second set of parallel so-called female links 3 overlying the first set. Each male link 1 is formed with three upstanding pivot posts 2 respectively at the ends and centre of the link which engage with pivot holes formed at corresponding positions of the female links 3 of the other set. Spring wires 4 each have one end attached to the centre pivot of a male link 1 and its other end engaging one of the end pivots of an adjacent male link 1, the wires being so bent and biassed as to urge the linkage to a retracted condition. The female links 3 are each covered with ornamental cases or covers 5 serving to conceal the pivot means springs.

In accordance with this invention, the male links 1 are produced by the following method.

Profiled metal stock 6 is used as shown in FIG. 2, having an upstanding web or rib 7 and preferably having a rounded upper surface on the flange of the T as shown. The material of the web 7 is first cut out so as to leave a number of equally spaced square posts 2 a predetermined distance apart, as shown in FIG. 3. Next the flanges are cut out along lines such as 8, FIG. 3, each embracing three consecutive posts 2. The corners of the posts are rounded off, as shown in FIG. 4, thereby providing a final link 1 complete with three pivot posts 2.

In a preferred form of the invention further, the female links 3 are produced in the following way. The initial stock in this case comprises strip material 9 having a cross section as shown in FIG. 5, i.e. flat on one side and with a broad, low, middle longitudinal ridge on the opposite side, rounded off on each side at the base of the ridge. The female links are then cut out from these strips in the manner shown by the lines 10, with the width l' of the cut-out portion of the strip being somewhat greater than the breadth l of the ridge. The length of the cut-out strip portion is selected equal to the length of the links. The resulting female links, as shown in FIG. 6, next have holes 11 perforated at suitable positions therein for receiving the posts 2 of the male links of the opposite set, and it will be seen from FIG. 6 that the resulting finished female links are provided with chamfers 12 along the base of one of their longitudinal sides resulting from the ridge on the original strip material 9. This form is found very convenient especially in that it provides an advantageous means of mounting and retaining the outer case 5 over the link. The final assembly including a pair of interpivoted links, wire spring and case is illustrated in enlarged cross section in FIG. 7.

Minor modifications may be made in the illustrated embodiment without departing from the scope of the invention.

What I claim is:

1. A method of making an expansible linkage for a wrist-band in which there is provided first and second sets of links, the method comprising removing at periodic spaced intervals portions of a straight web of rectangular cross-section which extends perpendicularly from a planar surface of a straight flange, to leave substantially regularly spaced upstanding posts on said flange, the flange being formed with an undersurface opposite the planar surface which is constituted by a smoothly rounded central portion joined to flat planar edge portions, removing interior portions of the flange such that each interior portion includes three upstanding posts, each of said portions being removed from said flange such that the lower surface of each portion is formed solely by the smoothly rounded central portion, the flange portion which remains after the interior portions are punched therefrom consisting of a continuous one piece flange with periodic openings therein, said interior portions constituting the first set of links of the linkage, removing portions from a straight strip of material having a planar surface and an opposite surface with a central flat ridge thereon joined in protruding fashion to edge portions of said opposite surface, each of the removed portions being an interior portion of the strip and being removed from said strip such that each portion has a flat surface formed from the planar surface of the strip and an undersurface opposite said flat surface which includes said central flat ridge and surfaces extending therefrom which constitute chamfers, the strip which remains after the removal of the portions therefrom being a continuous one piece body with openings therein corresponding to the removed portions, forming three spaced and aligned openings in each portion removed from the strip for accommodating upstanding posts of the first set of links whereby the portions removed from the strip are adapted to constitute the second set of links of the wrist-band, assembling the first and second sets of links together in continuous endless fashion to form a linkage and wherein each link of the second set accommodates respectively in the openings therein one of the posts of three adjacent links, the planar surface of the links of the first set being in face-to-face relation with the flat surface of the links of the second set which was formed from said central ridge, and enclosing a portion of the linkage by engaging a cover against the chamfers of the links of the second set.

2. A method as claimed in claim 1 comprising rounding edges of the upstanding posts of the first set to facilitate free rotation of the posts in the openings of the second links.

3. A method as claimed in claim 1 wherein the web has a width less than one third the width of the flange.

4. A method as claimed in claim 1 wherein the portions of the web are removed at spaced intervals to form upstanding posts of substantially square cross-section.

References Cited in the file of this patent

UNITED STATES PATENTS

| | | |
|---|---|---|
| 1,881,631 | Jewett | Oct. 11, 1932 |
| 1,945,359 | Weed | Jan. 30, 1934 |
| 2,155,584 | Bryant et al. | Apr. 25, 1939 |
| 2,188,833 | Dennison | Jan. 30, 1940 |
| 2,433,766 | Kubice | Dec. 30, 1947 |
| 2,675,669 | Shycon | Apr. 20, 1954 |
| 2,685,127 | Kaufmann | Aug. 3, 1954 |
| 2,740,252 | Schuster | Apr. 3, 1956 |
| 2,825,201 | Dansereau | Mar. 4, 1958 |
| 2,829,488 | Valli | Apr. 8, 1958 |
| 2,878,639 | Cline | Mar. 24, 1959 |

FOREIGN PATENTS

| | | |
|---|---|---|
| 258,932 | Switzerland | June 1, 1949 |
| 263,187 | Switzerland | Dec. 1, 1949 |